United States Patent
Peet et al.

(10) Patent No.: US 10,727,782 B2
(45) Date of Patent: Jul. 28, 2020

(54) SCHEDULE-BASED SUN TRACKER FOR INCREASING DIRECTNESS OF SUN EXPOSURE UPON A SOLAR PANEL TO IMPROVE ENERGY PRODUCTION

(71) Applicants: Dennis Peet, Coldwater, MI (US); Rene Graham, South Bend, IN (US)

(72) Inventors: Dennis Peet, Coldwater, MI (US); Rene Graham, South Bend, IN (US)

( * ) Notice: Subject to any disclaimer, the term of this patent is extended or adjusted under 35 U.S.C. 154(b) by 0 days.

(21) Appl. No.: 14/709,772

(22) Filed: May 12, 2015

(65) Prior Publication Data

US 2016/0336896 A1  Nov. 17, 2016

(51) Int. Cl.
| | | |
|---|---|---|
| H02S 20/32 | (2014.01) | |
| G01S 3/786 | (2006.01) | |
| F24S 30/452 | (2018.01) | |
| F24S 50/20 | (2018.01) | |

(52) U.S. Cl.
CPC ............ *H02S 20/32* (2014.12); *F24S 30/452* (2018.05); *F24S 50/20* (2018.05); *G01S 3/7861* (2013.01); *F24S 2050/25* (2018.05); *Y02E 10/47* (2013.01)

(58) Field of Classification Search
CPC ........ H02S 20/32; F24J 2002/385; F24J 2/38; G01S 3/7861; F24S 30/452; F24S 50/20; F24S 2050/25; Y02E 10/47
See application file for complete search history.

(56) References Cited

U.S. PATENT DOCUMENTS

| | | |
|---|---|---|
| 326,711 A | 9/1885 | Braune |
| 3,917,942 A | 11/1975 | McCay |
| 3,982,526 A | 9/1976 | Barak |
| 4,031,385 A | 6/1977 | Zerlaut et al. |
| 4,202,321 A | 5/1980 | Volna |
| 4,256,088 A | 3/1981 | Vindum |
| 4,274,394 A | 6/1981 | Stromberg |
| 4,361,758 A | 11/1982 | Rotolo |
| 4,404,465 A | 9/1983 | Miller |
| 4,561,423 A * | 12/1985 | Blasey .................... F24S 20/20 126/604 |
| 4,628,142 A | 12/1986 | Hashizume |

(Continued)

OTHER PUBLICATIONS http://energyfuture.wikidot.com/solar-resources, Parabolic Dish, Jan. 12, 2015.

(Continued)

*Primary Examiner* — Liesl C Baumann
(74) *Attorney, Agent, or Firm* — Russ Weinzimmer & Associates, P.C.

(57) ABSTRACT

A sun tracking system for use with a solar panel is disclosed. The system has an actuator configured to cause a change in orientation of a solar panel; and a logic controller configured to control the actuator in accordance with a schedule so as to change the orientation of the solar panel. The schedule includes a set of times throughout a day when the orientation of the solar panel will be changed, an orientation of the solar panel being associated with each time. The schedule can include a set of target orientations of the solar panel, each target orientation being associated with a time of day, including: sunrise+1 hour, sunrise+4 hours, sunrise+7 hours, and sunrise+10 hours, where each of the four orientations of the solar panel is most direct with respect to the position of the sun at that time of day.

10 Claims, 6 Drawing Sheets

(56) References Cited

U.S. PATENT DOCUMENTS

| | | | |
|---|---|---|---|
| 4,765,144 A * | 8/1988 | Spacer | E21B 43/121 417/379 |
| 5,632,823 A | 5/1997 | Sharan | |
| 6,239,353 B1 | 5/2001 | Hall et al. | |
| 6,284,968 B1 | 9/2001 | Niesyn | |
| 6,870,087 B1 * | 3/2005 | Gallagher | H01L 31/02008 136/246 |
| 7,884,279 B2 | 2/2011 | Dold et al. | |
| 7,884,308 B1 | 2/2011 | Mejia | |
| 8,299,412 B2 | 10/2012 | Pan | |
| 2004/0112373 A1 | 6/2004 | Djeu | |
| 2008/0264474 A1 * | 10/2008 | Frauenknecht | H02S 20/30 136/251 |
| 2009/0205636 A1 | 8/2009 | Gangemi | |
| 2010/0192941 A1 | 8/2010 | Stoia et al. | |
| 2010/0294337 A1 * | 11/2010 | Sherman | F24J 2/38 136/246 |
| 2011/0220176 A1 * | 9/2011 | Halpern | F24S 30/425 136/246 |
| 2012/0152313 A1 * | 6/2012 | Hinman | G01S 3/7861 136/246 |
| 2013/0098425 A1 | 4/2013 | Amin et al. | |
| 2014/0026940 A1 * | 1/2014 | Alonso Salmeron | H02S 20/00 136/246 |
| 2016/0020725 A1 * | 1/2016 | Miyahara | F24S 30/422 136/246 |
| 2016/0153681 A1 * | 6/2016 | Plourde | F24S 50/40 126/586 |

OTHER PUBLICATIONS http://www.mdpub.com/suntracker/, How I built a motorized sun tracker for my solar panels, Jan. 12, 2015.

http://hackaday.com/2011/06/17/a-simple-diy-solar-tracker/, A Simple DIY Solar Tracker, Jan. 12, 2015.

* cited by examiner

SCHEDULE-BASED SUN TRACKER FOR INCREASING DIRECTNESS OF SUN EXPOSURE UPON A SOLAR PANEL TO IMPROVE ENERGY PRODUCTION

FIELD OF THE INVENTION

This invention generally relates to sun tracking systems, and more particularly to automated sun tracking systems.

BACKGROUND

Solar panels are used to harness energy from the sun. To maximize the energy output of a solar panel, sun exposure to the solar panel needs to be as direct as possible. Since the sun's position changes over the course of a day, fixed solar panels cannot operate at peak performance throughout the day.

Current systems for increasing directness of sun exposure upon solar panels require manually adjusting the solar panels as the sun's position changes over the course of the day. Manually rotating solar panels can be laborious, time consuming, and often forgotten. Alternatively, known automated systems use costly, complex, and potentially unreliable sensors and computer algorithms to estimate the optimal position for a solar panel.

SUMMARY OF THE INVENTION

One general aspect of the invention is a sun tracking system for use with a solar panel. The system includes: an actuator having an extendable arm, the extendable arm being configured to cause a change in orientation of a solar panel; and a logic controller, the logic controller being configured to control the actuator so as to extend the extendable arm in accordance with a schedule so as to change the orientation of the solar panel connected to the arm.

In some embodiments, the schedule includes a set of times throughout a day, an orientation of the solar panel being associated with each time of the set of times.

In some embodiments, the schedule consists of: an orientation of the solar panel towards where the sun rises, an orientation of the solar panels towards where the sun sets, and two orientations therebetween.

In some embodiments, the logic controller automatically powers on the actuator for a duration of time to automatically rotate the solar panel.

In some embodiments, the logic controller automatically selects a polarity to drive the extendable arm in a particular direction.

In some embodiments, the system further includes a reed switch configured to output, to the logic controller, information identifying a position of the extendable arm, wherein the position of the extendable arm corresponds to a position of the solar panel. In further embodiments, the reed switch outputs electronic pulses identifying the position of the extendable arm.

In some embodiments, the logic controller determines an amount of time to drive the extendable arm based on the position of the extendable arm.

In some embodiments, the actuator includes an electromechanical motor configured to drive the extendable arm.

In some embodiments, driving the extendable arm to cause the solar panel to rotate increases directness of sun exposure upon the solar panel.

Another general aspect of the invention is a method for increasing directness of sun exposure upon a solar panel. The method includes: determining, by a control device for a sun tracking system, a current position of an actuator arm, the current position of the actuator arm corresponding to a current orientation of a solar panel cooperative with the actuator arm; determining, by the control device, a target position of the actuator arm using a current time and a schedule associating a set of times with a set of associated target orientations of the solar panel; determining, by the control device, a duration of time that an actuator, connected to the actuator arm, should be powered on to move the actuator arm from the current position to the target position; and powering on, by the control device, the actuator for the determined duration of time to move the actuator arm from the current position to the target position, wherein moving the actuator arm rotates the solar panel from the current orientation of the solar panel to a target orientation of the solar panel.

In some embodiments, the schedule associating a set of times with a set of associated target orientations of the solar panel includes: four orientations of the solar panel determined for each of these four times of day, measured with respect to sunrise: sunrise+1 hour, sunrise+4 hours, sunrise+7 hours, and sunrise+10 hours, where each of the four orientations of the solar panel is most direct with respect to the position of the sun at that time. In some embodiments, the schedule is used throughout an entire year without modification.

In some embodiments, the method further includes receiving, from a reed switch connected to the actuator arm, information identifying the position of the actuator arm after moving the actuator arm; and storing the information identifying the position of the actuator arm.

In some embodiments, determining the duration of time further includes determining a polarity to move the actuator arm, wherein the polarity corresponds to a direction to move the actuator arm.

Another general aspect of the invention is a control device for a sun tracking system, the control device including: a non-transitory memory device storing a plurality of processor-executable instructions; and a processor configured to execute the processor-executable instructions, thereby causing the control device to: determine a current position of an actuator arm, the current position of the actuator arm corresponding to a current orientation of a cooperative solar panel; determine a target position of the actuator arm, the target position of the actuator arm being based on a current time and a schedule identifying the target position of the actuator arm at the current time; determine a duration of time that an actuator should be powered on to move the actuator arm from current position to the target position; and power on the actuator for the determined duration of time to move the actuator arm from the current position to the target position, wherein moving the actuator arm rotates the solar panel from the current position of the solar panel to a target position of the solar panel.

In some embodiments, the schedule identifying the target position of the actuator arm at the current time includes a set of target orientations of the solar panel, each target orientation being associated with a time of day, including: four orientations of the solar panel determined for each of these four times of day, measured with respect to sunrise: sunrise+1 hour, sunrise+4 hours, sunrise+7 hours, and sunrise+10 hours, where each of the four orientations of the solar panel is most direct with respect to the position of the sun at that time.

In some embodiments, moving the actuator arm increases directness of sun exposure upon the solar panel.

In some embodiments, executing the processor-executable instructions further causes the control device to: receive, from a reed switch connected to the actuator arm, information identifying the position of the actuator arm after moving the actuator arm; and store the information identifying the position of the actuator arm.

In some embodiments, executing the processor-executable instructions, to determine the duration of time, further causes the control device to determine a polarity to move the actuator arm, wherein the polarity corresponds to a direction to move the actuator arm.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION

Figure 1:
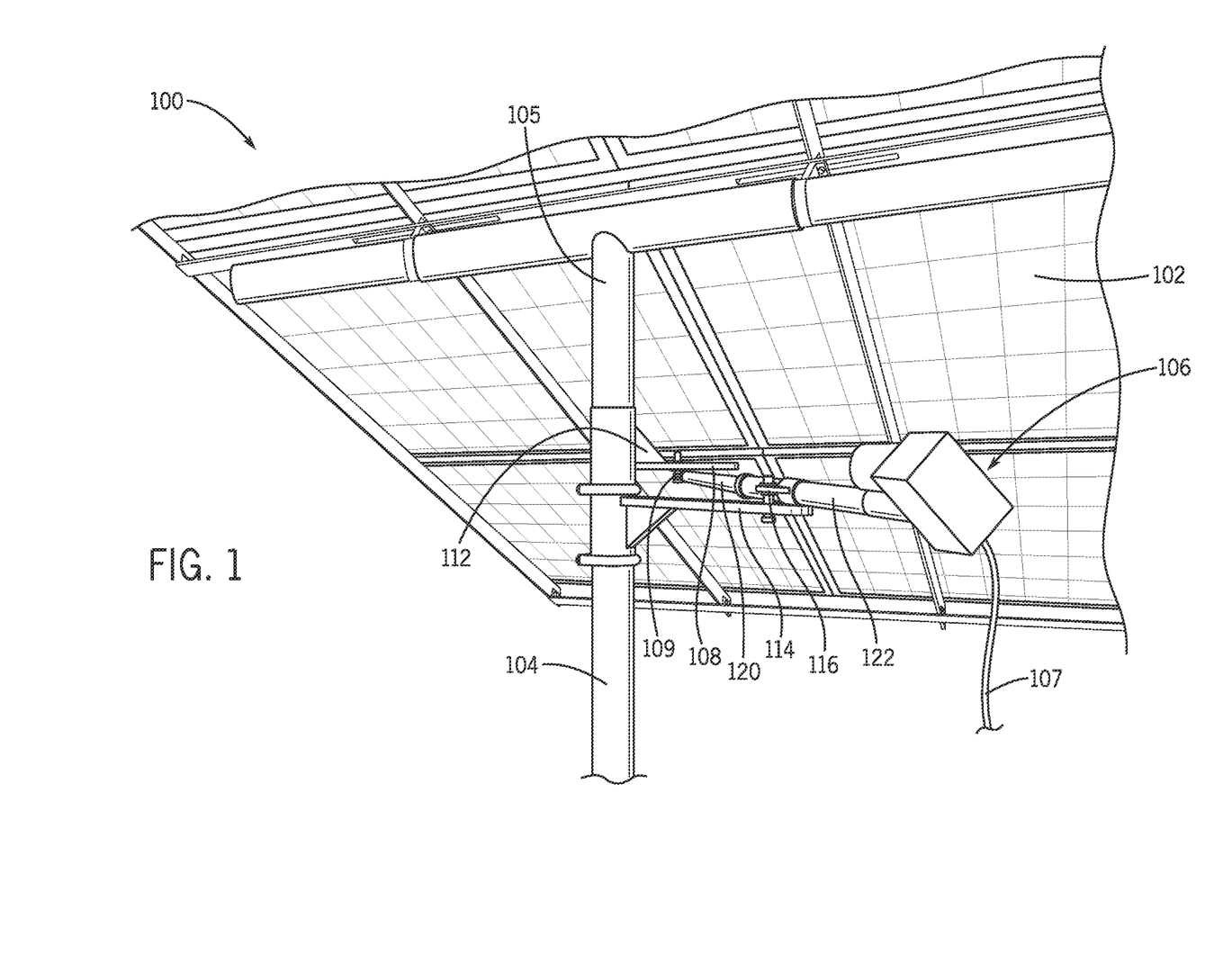
FIG. 1 is a rear view of a solar panel, including the sun tracker of the present invention for rotation of the solar panel.

FIG. 1 is an overview of an automated sun tracker 100 in accordance with the present invention. As shown in FIG. 1, automated sun tracker 100 controls the rotational orientation of a solar panel 102, that is mounted upon a rotating support post 105, the rotating post 105 and solar panel 102 being rotationally supported by a fixed ground support post 104. An actuator 106, energized by a power line 107, causes linear displacement of an extendable arm 120 that is coupled to a rotating arm 108, which is attached to the rotating support post 105 with the help of a bracket 112, to thereby apply rotational force to the rotating support post 105.

A fixed arm 114 is attached to the fixed ground support post 104, and supports the actuator arm 120, via the arm housing 122, where the actuator arm 120 can extend to various extents from the arm housing 122. For clarity, a rear side of solar panel 102 is shown in FIG. 1.

A bottom portion of fixed support post 104 is installed in-ground, and a top portion of fixed support post 104 rotatably attaches to rotating support post 105. For example, rotating support post 105 is hollow and is T-shaped, and fits over fixed support post 104. Since rotating support post 105 is hollow, rotating support post 105 is rotatable about an axis parallel and running through fixed support post 104. The top portion of the T-shaped rotating support post 105 attaches to solar panel 102, and thus, solar panel 102 is rotatable along with rotating support post 105.

Rotating arm 108 is fixed to rotating support post 105 via bracket 112. Rotating arm 108 is also fixed to actuator arm 120 via actuator arm attachment 109. Actuator 106 is connected to power line 107. Actuator 106 can receive power via power line 107 to drive actuator arm 120 horizontally along an axis parallel to actuator arm 120. For example, actuator 106 can include an electromagnetic motor to drive one or more gears that, when turned, provide translational motion to actuator arm 120. When actuator arm 120 is driven, actuator arm 120 can either push or pull rotating arm 108, which in turn, rotates rotating support post 105, thereby rotating solar panel 102. Actuator arm housing 122 can house actuator arm 120 as actuator arm 120 is driven inwardly (e.g., towards actuator 106). Actuator arm housing 122 is also attached to actuator 106. Actuator arm housing 122 connects to fixed support post 104 via fixed arm 114. Actuator arm housing 122 connects to fixed arm 114 via bolt 116.

Actuator 106 is automatically controlled by a logic controller to periodically rotate solar panel 102 during daytime hours to increase the directness of sun exposure upon solar panel 102, thereby improving energy output by solar panel 102. Since actuator 106 can be automatically controlled, the operator does not have to remember to rotate solar panel 102, and thus, the directness of sun exposure onto solar panel 102 can automatically be improved, thereby increasing energy output by solar panel 102 as compared with a situation where the solar panel 102 is fixed in orientation throughout each day.

Figure 2:
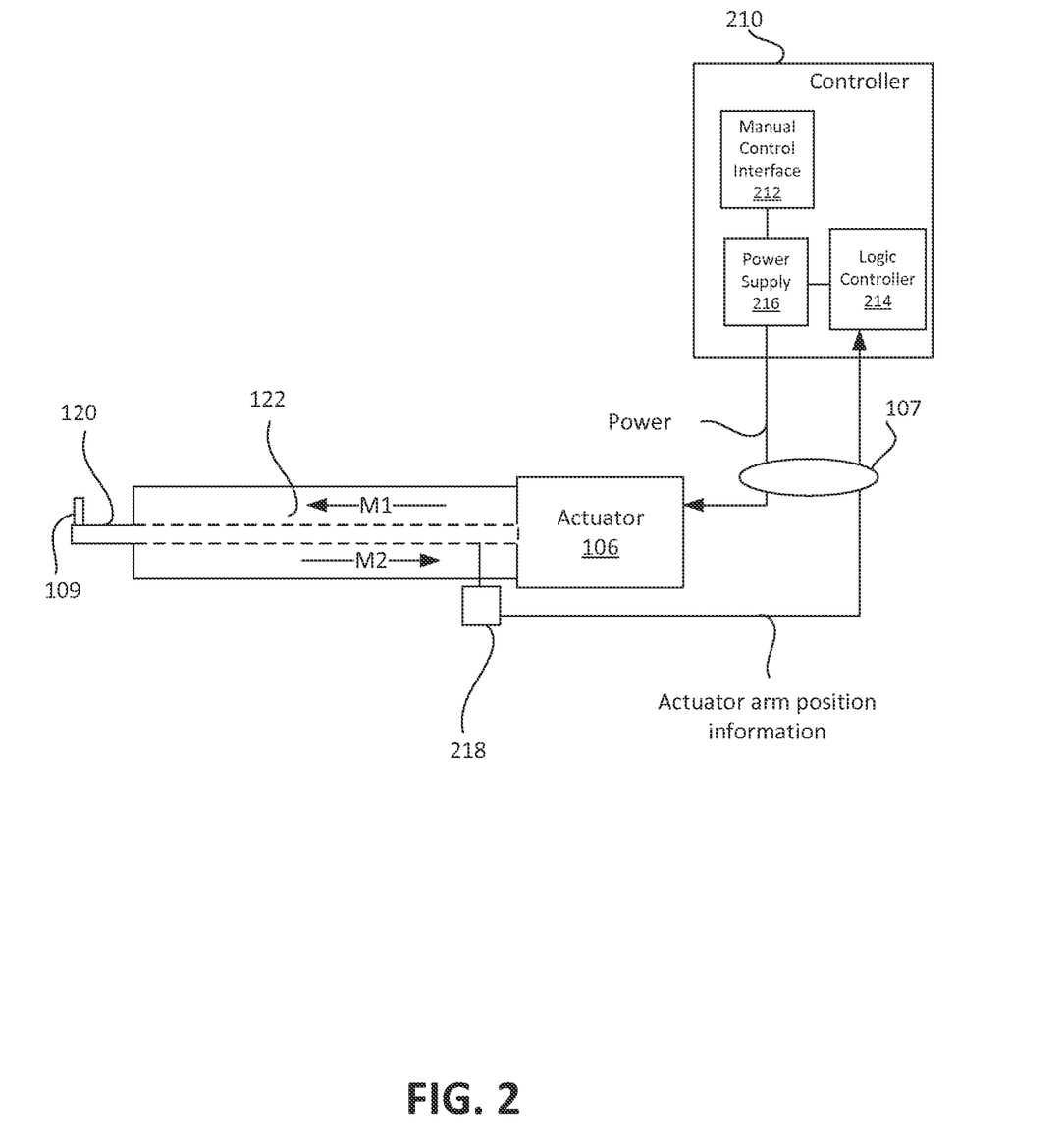
FIG. 2 is a top-level schematic diagram of the sun tracker of FIG. 1, showing functional components of an actuator controller, and operations of the actuator in FIG. 1.

FIG. 2 is a top-level schematic diagram of the sun tracker of FIG. 1, showing functional components of an actuator controller, and operations of the actuator 106 in FIG. 1. As shown in FIG. 2, a controller 210 includes a manual control interface 212, a logic controller 214, and a power supply 216. Manual control interface 212 and logic controller 214 control power supply 216 to provide power for the operation of actuator 106. For example, manual control interface 212 and logic controller 214 can open or close a power switch on power supply 216 to cause power supply 216 to provide power, or discontinue providing power, to actuator 106. Also, manual control interface 212 and logic controller 214 can open or close power switch associated with a particular polarity to control a spin direction of gears connected to an electromagnetic motor of actuator 106, thereby controlling the drive direction of actuator arm 120 (e.g., in the direction M1 or M2). Manual control interface 212 can include knobs, buttons, touchscreens, or other similar devices to permit an operator to manually control actuator 106 to manually position solar panel 102. Also, manual control interface 212 can be used to input a program into logic controller 214.

Logic controller 214 can automatically control the operation of actuator 106. For example, logic controller 214 can execute a preinstalled program, or a program input by an operator via manual control interface 212. A program can identify what the position of solar panel 102 should be at a particular time. The position of solar panel 102 corresponds to a position of actuator arm 120. Reed switch 218 can be connected to the actuator arm 120, and can output information identifying the position of actuator arm 120 (e.g., in the form of pulses) to logic controller 214. Logic controller 214 can store this information, so that logic controller 214 can determine a duration that actuator 106 should be powered on, and a polarity in order for actuator 106 to position actuator arm 120 to a target position from a current position.

Figure 3:
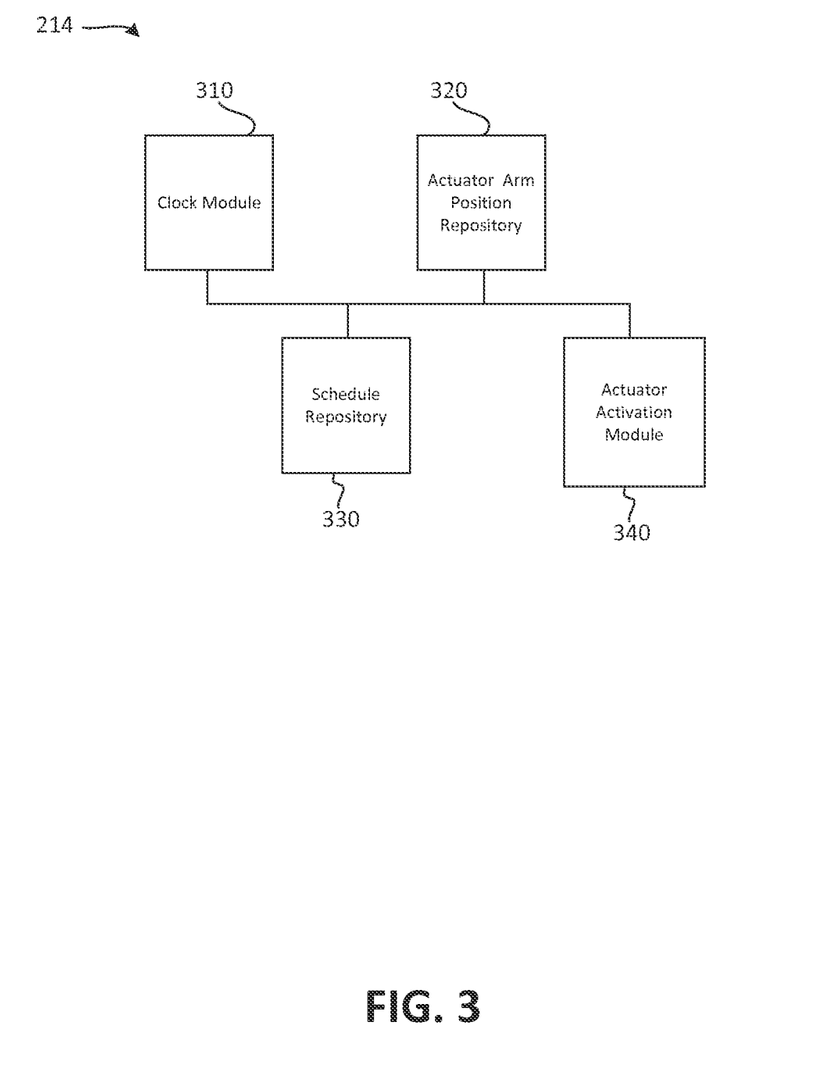
FIG. 3 is a bock diagram of functional components of the logic controller of FIG. 2.

FIG. 3 is a diagram of functional components of the logic controller of FIG. 2. As shown in FIG. 3, logic controller 214 can include clock module 310, actuator arm position repository 320, schedule repository 330, and actuator activation module 340.

Clock module 310 can include a clock that identifies a current time of day. Actuator arm position repository 320 stores information, received from reed sensor 218, identifying a current position of actuator arm 120. Schedule repository 330 stores schedules identifying what the position of solar panel 102 (and the corresponding position of actuator arm 120) should be at different times of day. The schedules can be based on a directory that includes sun position timing data for various geographic locations at which the automated sun tracker solar panel 100 can be located.

Alternatively, the schedule can be constructed by the user on-site. For example, there can be four orientations of the solar panel determined for each of these four times, measured with respect to sunrise: sunrise+1 hour, sunrise+4 hours, sunrise+7 hours, and sunrise+10 hours. A table can be constructed by the user pairing each time with the corresponding orientation of the solar panel array that is most direct with respect to the position of the sun at that time. This table can be used throughout an entire year.

Actuator activation module 340 can determine a target position of solar panel 102 (and a corresponding target position of actuator arm 120) based on the current time and based on schedules stored by schedule repository 330. Actuator activation module 340 can also determine the duration that actuator 106 should be powered on to move actuator arm 120 to the target position. The longer actuator 106 is powered on, the longer actuator arm 120 will be driven. Actuator activation module 340 can also determine the polarity which actuator 106 should operate to move actuator arm 120 to the target position. Actuator activation module 340 can then interact with power supply 216 to power on actuator 106, at the determined polarity, for the determined duration of time to position actuator arm 120 (and hence, solar panel 102) in the target position.

Figure 4:
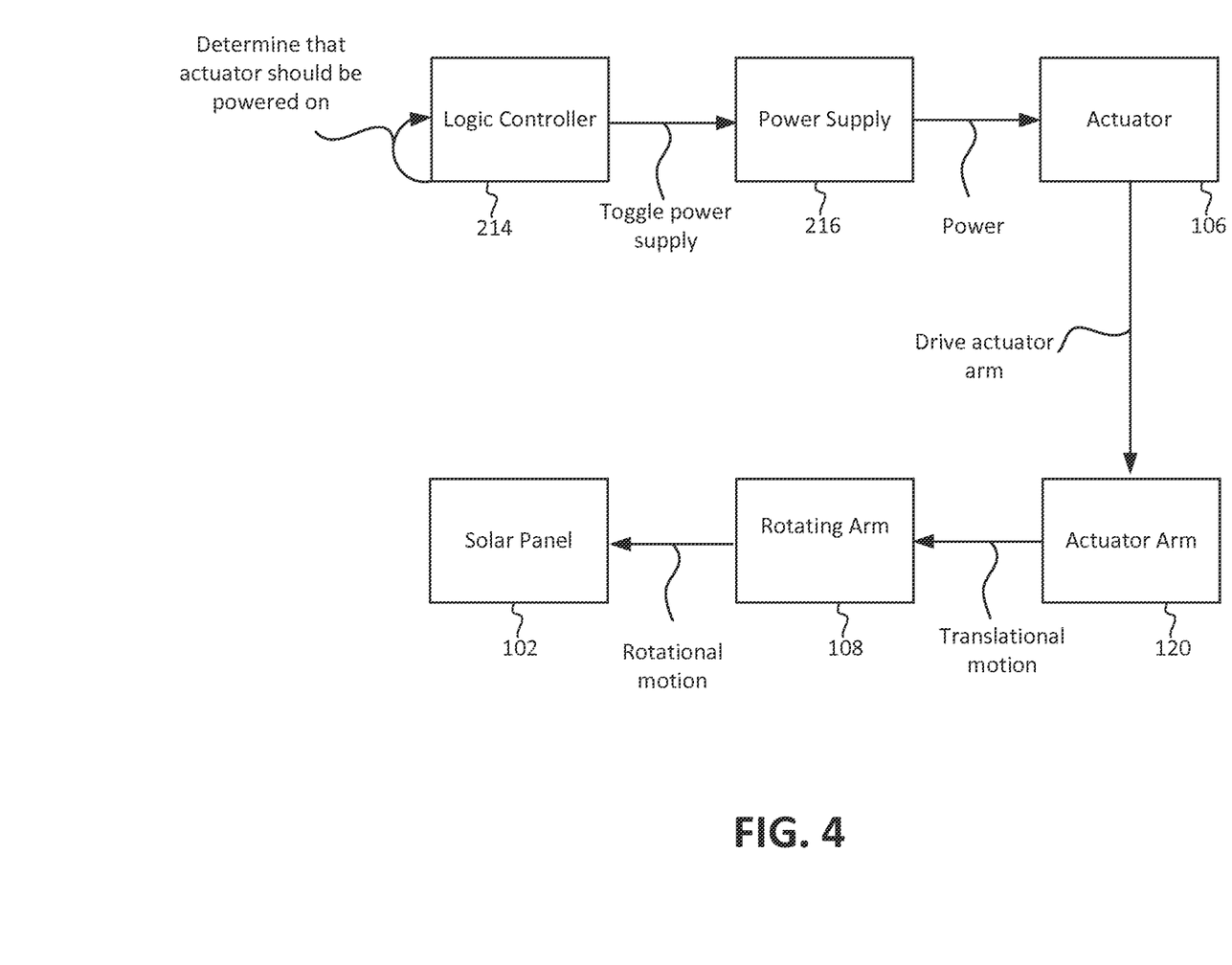
FIG. 4 is an operational flow diagram of functional components of the sun tracker of FIG. 1.

FIG. 4 is a process flow diagram showing a sequence of actions of the functional components of the sun tracker. As shown in FIG. 4 logic controller 214 determines that actuator 106 should be powered on, and can toggle a power switch based on determining that actuator 106 should be powered on. Based on toggling the power switch, power supply 216 can deliver a voltage to actuator 106 to energize actuator 106. When energized, an electromagnetic motor of actuator 106 can drive gears that, when turned, provide translational motion to actuator arm 120. This translational motion can push or pull rotating arm 108, which provides rotational motion to rotating support post 105, and thus, to solar panel 102. The rotational motion of solar panel 102 allows it to reach an orientation determined by the controller 210.

Figure 5:
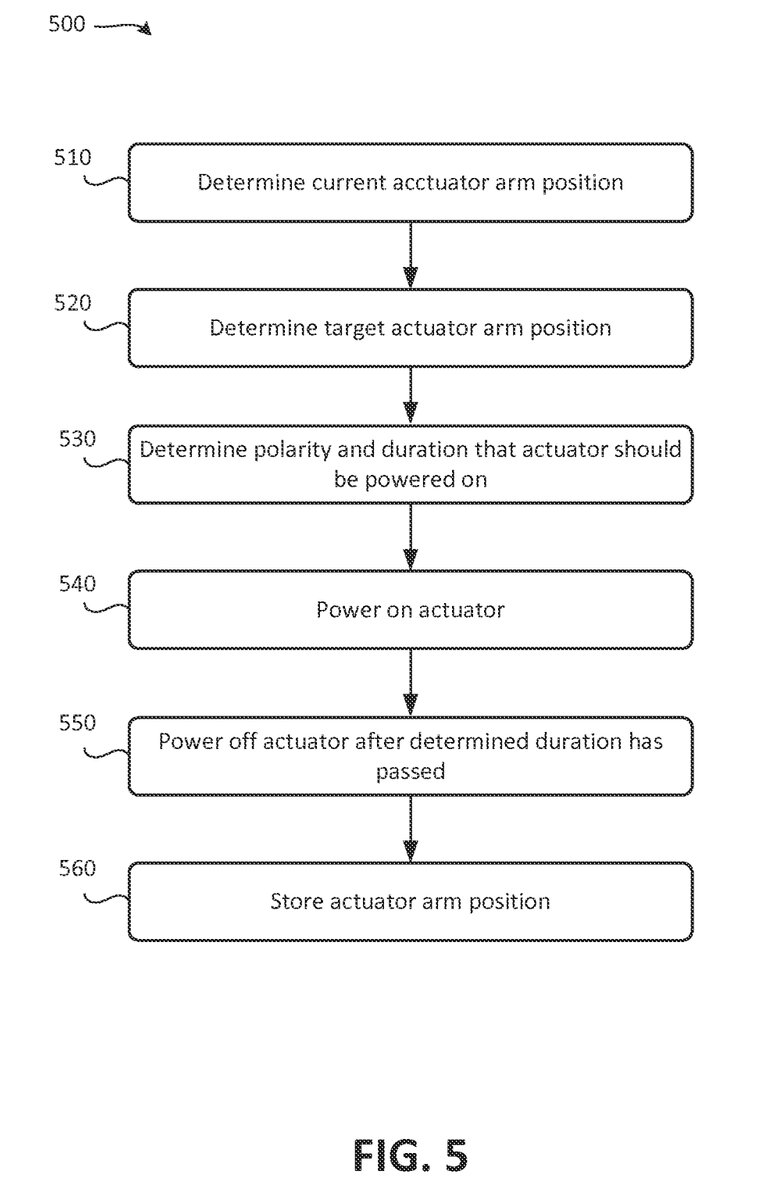
FIG. 5 is a flowchart of an example process for automatically controlling the position of a solar panel.

FIG. 5 is a flowchart of an example process for automatically controlling the position of a solar panel. Process 500 can be performed by logic controller 214.

As shown in FIG. 5, process 500 can include determining a current actuator arm position (step 510). For example, logic controller 214 can determine the current actuator arm position based on information received from reed sensor 218 and stored in actuator arm position repository 320.

Process 500 further include determining a target actuator arm position (step 520). For example, logic controller 214 can determine the target actuator arm 120 position based on a current time and information identified in a schedule indicating the target position of actuator arm 120 at different times.

Process 500 can also include determining the polarity and duration that the actuator should be powered on (step 530). For example, logic controller 214 can determine the polarity and the duration that actuator 106 should be powered for actuator arm 120 to be moved from the current position to the target position. The longer actuator 106 is powered on, the longer actuator arm 120 will be driven.

Process 500 can further include powering on the actuator (step 540). For example, logic controller 214 can power on actuator 106 by toggling a power switch on power supply 216, thereby delivering power to actuator 106.

Process 500 can also include powering off the actuator after the determined duration has passed (step 550). For example, logic controller 214 can power off actuator 106 after the determined duration has passed by again toggling the power switch on power supply 216.

Process 500 can also include storing the actuator arm position (step 560). For example, logic controller 214 can receive information indicating the position of actuator arm 120 from reed sensor 218 via pulses output by reed sensor 218. Logic controller 214 can store the information indication the position of actuator arm 120 so that logic controller 214 can later determine the polarity and duration that actuator 106 should be powered on to move actuator arm 120 from a current position to a target position.

As described, actuator 106 can be automatically controlled by a logic controller to periodically rotate solar panel 102 during daytime hours to increase directness of sun exposure upon solar panel 102, thereby increasing energy output by solar panel 102. Since actuator 106 can be automatically controlled, the operator does not have to remember to rotate solar panel 102, and thus, the directness of sun exposure upon solar panel 102 can be automatically increased, thereby increasing energy output by solar panel 102. As a result, substantial cost savings can be realized by reducing the amount of non-renewable energy consumed. For example, according to some estimates, automatic sun tracking can increase solar panel output amperage by an average of 40%.

Figure 6:
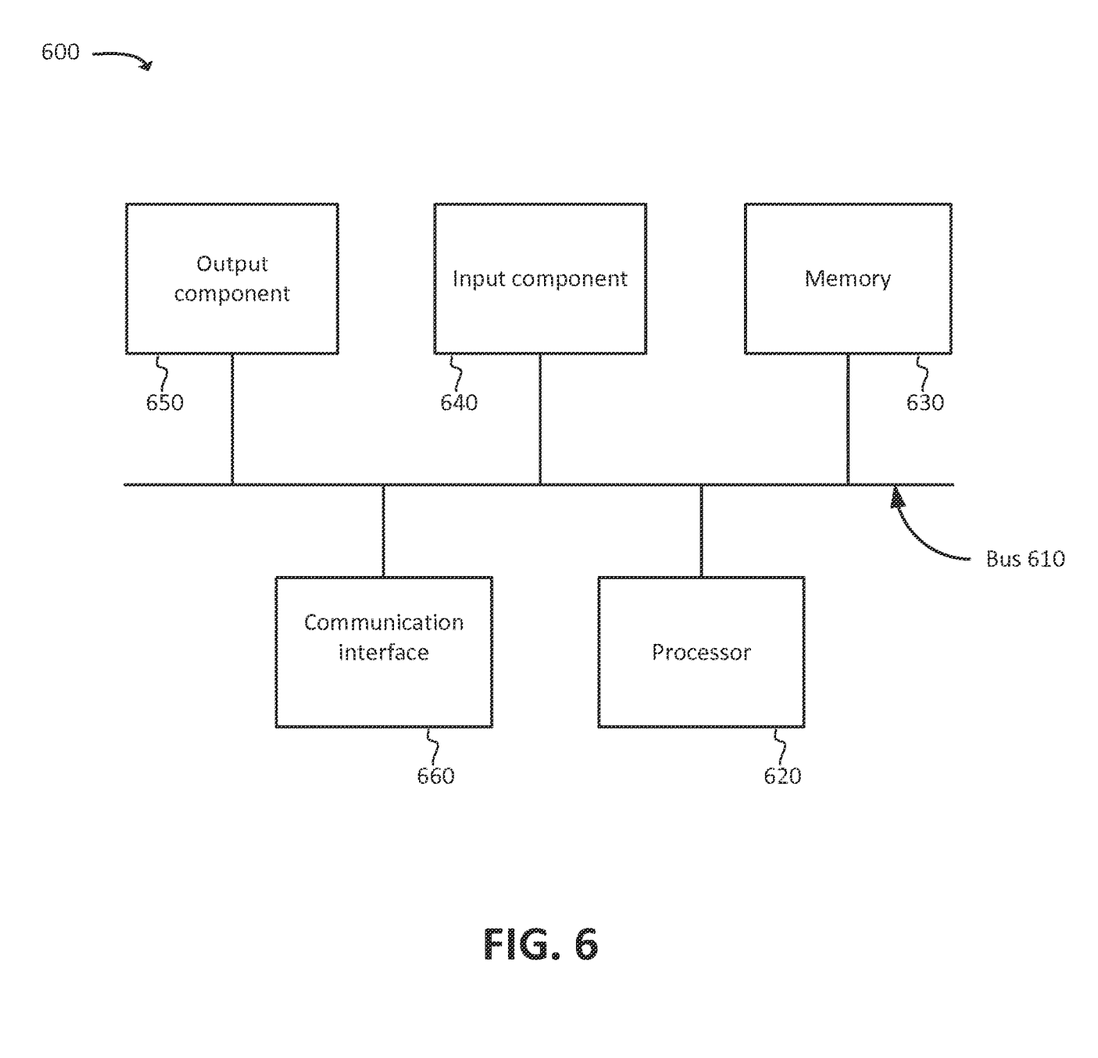
FIG. 6 is a block diagram of example components of the controller, according to one or more implementations described herein.

FIG. 6 is a diagram of example components of the controller, according to one or more implementations described herein. Controller 210 can include one or more devices 600. Device 600 can include bus 610, processor 620, memory 630, input component 640, output component 650, and communication interface 660. In another implementation, device 600 can include additional, fewer, different, or differently arranged components.

Bus 610 can include one or more communication paths that permit communication among the components of device 600. Processor 620 can include a processor, microprocessor, or processing logic that can interpret and execute instructions. Memory 630 can include any type of dynamic storage device that can store information and instructions for execution by processor 620, and/or any type of non-volatile storage device that can store information for use by processor 620.

Input component 640 can include a mechanism that permits an operator to input information to device 600, such as a keyboard, a keypad, a button, a switch, etc. Output component 650 can include a mechanism that outputs information to the operator, such as a display, a speaker, one or more light emitting diodes (LEDs), etc.

Communication interface 660 can include any transceiver-like mechanism that enables device 600 to communicate with other devices and/or systems. For example, communication interface 660 can include an Ethernet interface, an optical interface, a coaxial interface, or the like. Communication interface 660 can include a wireless communication device, such as an infrared (IR) receiver, a Bluetooth® radio, or the like. The wireless communication device can be coupled to an external device, such as a remote control, a wireless keyboard, a mobile telephone, etc. In some embodiments, device 600 can include more than one communication interface 660. For instance, device 600 can include an optical interface and an Ethernet interface.

Device 600 can perform certain operations relating to one or more processes described above. Device 600 can perform these operations in response to processor 620 executing software instructions stored in a computer-readable medium, such as memory 630. A computer-readable medium can be defined as a non-transitory memory device. A memory device can include space within a single physical memory device or spread across multiple physical memory devices. The software instructions can be read into memory 630 from another computer-readable medium or from another device. The software instructions stored in memory 630 can cause processor 620 to perform processes described herein. Alternatively, hardwired circuitry can be used in place of or in combination with software instructions to implement processes described herein. Thus, implementations described herein are not limited to any specific combination of hardware circuitry and software.

It is to be understood that the disclosure in this specification includes all possible combinations of particular features, regardless of whether a combination is explicitly described. For example, where a particular feature is disclosed in the context of a particular aspect or embodiment of the invention, that feature can also be used, to the extent possible, in combination with and/or in the context of other particular aspects and embodiments of the invention, and in the invention generally.

Other modifications and implementations will occur to those skilled in the art without departing from the spirit and the scope of the invention as claimed. Accordingly, the above description is not intended to limit the invention, except as indicated in the following claims. For example, while series of steps have been described with regard to FIG. 5, the order of the steps may be modified in other implementations. Further, non-dependent steps may be performed in parallel.

The actual software code or specialized control hardware used to implement an embodiment is not limiting of the embodiment. Thus, the operation and behavior of the embodiment has been described without reference to the specific software code, it being understood that software and control hardware can be designed based on the description herein.

What is claimed is:

1. A system for positioning a solar panel to increase directness of sun exposure upon the solar panel, the system comprising:
    a fixed support post, a first end of which is configured to be installed in-ground;
    a rotating support post, a first end of which is configured to be rotatably supported by a second end of the fixed support post, and a second end of the rotating support configured to be coupled to the solar panel;
    an actuator configured to:
        linearly displace an extendable arm bi-directionally, the extendable arm being supported by the fixed support post, and
        the linear displacement of the extendable arm causing a change in rotational position of the solar panel about an axis defined by the fixed and rotating support posts, the rotational position of the solar panel being defined by a corresponding linear displacement of the extendable arm;
    a reed sensor configured to determine a current linear position of the extendable arm and to provide the current linear position in the form of an electrical signal; and
    a logic controller including a non-transitory memory configured to store a predetermined schedule of target rotational orientations of the solar panel each associated with a unique time of day, each of the target rotational orientations being stored as a target linear position of the extendable arm to which each of the target rotational orientations corresponds,
        whereby at each unique time of day of the schedule, the logic controller is configured to:
            retrieve the stored target linear position associated with the unique time of day,
            turn on power to the actuator to enable linear displacement of the extendable arm until the current linear position of the extendable arm received from the reed sensor equals the retrieved target linear position representing the target rotational orientation of the solar panel, and
            turn off the power to the actuator.

2. The system of claim 1, wherein:
    the unique time associated with each of the target rotational orientations of the schedule is specified as a fixed number of elapsed hours relative to sunrise for a given day,
    the target rotational orientations of the schedule are specified to increase directness of sun exposure upon the solar panel at the corresponding unique times of day, and
    target rotational orientations for each of the unique times of day of the schedule are derived from sun position timing data based on geographical location.

3. The system of claim 2, wherein the schedule can be generated automatically through execution of a preinstalled program.

4. The system of claim 1, wherein the logic controller is configured to automatically turn on a power supply coupled to the actuator at each unique time of day of the schedule for a duration of time sufficient to permit the current linear position of the extendable arm to reach the target linear position of the extendable arm, the duration being determined based on the current linear position of the extendable arm prior to turning on the actuator.

5. The system of claim 4, wherein the logic controller is configured to automatically determine a directional polarity of the linear displacement by which to drive the extendable arm to achieve the target linear position, the polarity being derived from the current linear position immediately preceding a next unique time of day of the schedule and the target position associated with the next unique time of the day of the schedule.

6. The system of claim 5, wherein the reed sensor is a reed switch configured to output, to the logic controller, an electrical signal in the form of electrical pulses that define the current linear position of the extendable arm.

7. The system of claim 1, wherein the logic controller is configured to be manually programmed with the unique times of day and associated target linear positions of the schedule through a user control interface.

8. The system of claim 1, wherein the actuator includes an electromechanical motor configured to drive the extendable arm.

9. The system of claim 1, wherein the schedule consists of the same specified plurality of target rotational positions associated with the same specified unique times relative to sunrise, for every day up to a year.

10. The system of claim 1, wherein:
the controller is configured to generate the schedule automatically through execution of a preinstalled program; and
the controller is configured to receive the schedule manually though a user control interface.

* * * * *